United States Patent
Ketcham et al.

(10) Patent No.: US 6,717,919 B1
(45) Date of Patent: Apr. 6, 2004

(54) IMPRINTING METHOD FOR AUTOMATED REGISTRATION AND CONFIGURATION OF NETWORK DEVICES

(75) Inventors: Carl Ketcham, Taylorsville, UT (US); Nathan Whitney, West Jordan, UT (US); Allen Shupe, Sandy, UT (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/447,280

(22) Filed: Nov. 23, 1999

(51) Int. Cl.[7] .............................................. H04L 12/28
(52) U.S. Cl. ....................... 370/255; 338/349; 338/401
(58) Field of Search ................................ 370/229, 230, 370/231, 235, 236, 310, 312, 351, 389, 390, 392, 393, 400, 428, 429, 432, 445, 447, 448, 338, 254, 255, 401, 349

(56) References Cited

U.S. PATENT DOCUMENTS

| | | | |
|---|---|---|---|
| 5,526,489 A | | 6/1996 | Nilakantan et al. .... 395/200.02 |
| 5,574,860 A | * | 11/1996 | Perlman et al. ............. 709/220 |
| 5,655,148 A | | 8/1997 | Richman et al. ............ 395/828 |
| 5,737,318 A | * | 4/1998 | Melnik ....................... 370/254 |
| 5,740,160 A | * | 4/1998 | Ikegami et al. ............. 370/255 |
| 5,748,980 A | | 5/1998 | Lipe et al. .................. 395/828 |
| 5,812,531 A | * | 9/1998 | Cheung et al. ............. 370/331 |
| 5,825,752 A | | 10/1998 | Fujimori et al. ............ 370/260 |
| 5,909,429 A | * | 6/1999 | Satyanarayana et al. .... 370/254 |
| 5,920,699 A | * | 7/1999 | Bare .......................... 709/225 |
| 5,974,236 A | * | 10/1999 | Sherman ..................... 709/221 |
| 5,978,364 A | * | 11/1999 | Melnik ....................... 370/320 |
| 6,012,088 A | * | 1/2000 | Li et al. .................. 379/88.02 |
| 6,046,978 A | * | 4/2000 | Melnik ....................... 370/221 |
| 6,047,330 A | * | 4/2000 | Stracke, Jr. ................. 709/238 |
| 6,052,803 A | * | 4/2000 | Bhatia et al. ................. 714/49 |
| 6,070,187 A | * | 5/2000 | Subramaniam et al. ...... 709/220 |
| 6,188,675 B1 | * | 2/2001 | Casper et al. ................ 370/254 |
| 6,272,113 B1 | * | 8/2001 | McIntyre et al. ........... 370/248 |
| 6,343,320 B1 | * | 1/2002 | Fairchild et al. ............ 709/224 |
| 6,381,218 B1 | * | 4/2002 | McIntyre et al. ........... 370/245 |
| 6,415,330 B1 | * | 7/2002 | Okanoue ..................... 709/245 |
| 6,421,731 B1 | * | 7/2002 | Ciotti et al. ................. 709/238 |
| 6,480,889 B1 | * | 11/2002 | Saito et al. .................. 709/220 |
| 2002/0026504 A1 | * | 2/2002 | Lo ............................. 709/220 |

OTHER PUBLICATIONS

Douglas E. Comer, Internetworking with TCP/IP, Principles, Protocols, and Architecture, vol. I, Third Edition, 1995, published b Prentic–Hall, Inc., pp. 60–61, and 83–99.*
Pending U.S. patent application Ser. No. 09/447,281 filed Nov. 23, 1999.

* cited by examiner

Primary Examiner—Kenneth Vanderpuye
Assistant Examiner—Van Nguyen
(74) Attorney, Agent, or Firm—McDonnell Boehnen Hulbert & Berghoff

(57) ABSTRACT

New network elements that are installed in a network are automatically configured using an imprinting process. In this process, when they are first installed and turned on they start listening for packets on the network. When a packet is received, the new network element "imprints" to this packet by adopting configuration information, such as site ID and subnet ID values, that are contained in one or more fields in the first packet. The site ID and subnet ID values allow the new network element to intelligently communicate with other network elements. If the new network element does not receive a packet in a given amount of time, e.g., 30 or 60 minutes, the new network element assumes that it is the first element of the network. It therefore adopts site ID and subnet ID values from another source, such as deriving them from a pre-installed, 48-bit Medium Access Control address that is assigned to the network element.

9 Claims, 6 Drawing Sheets

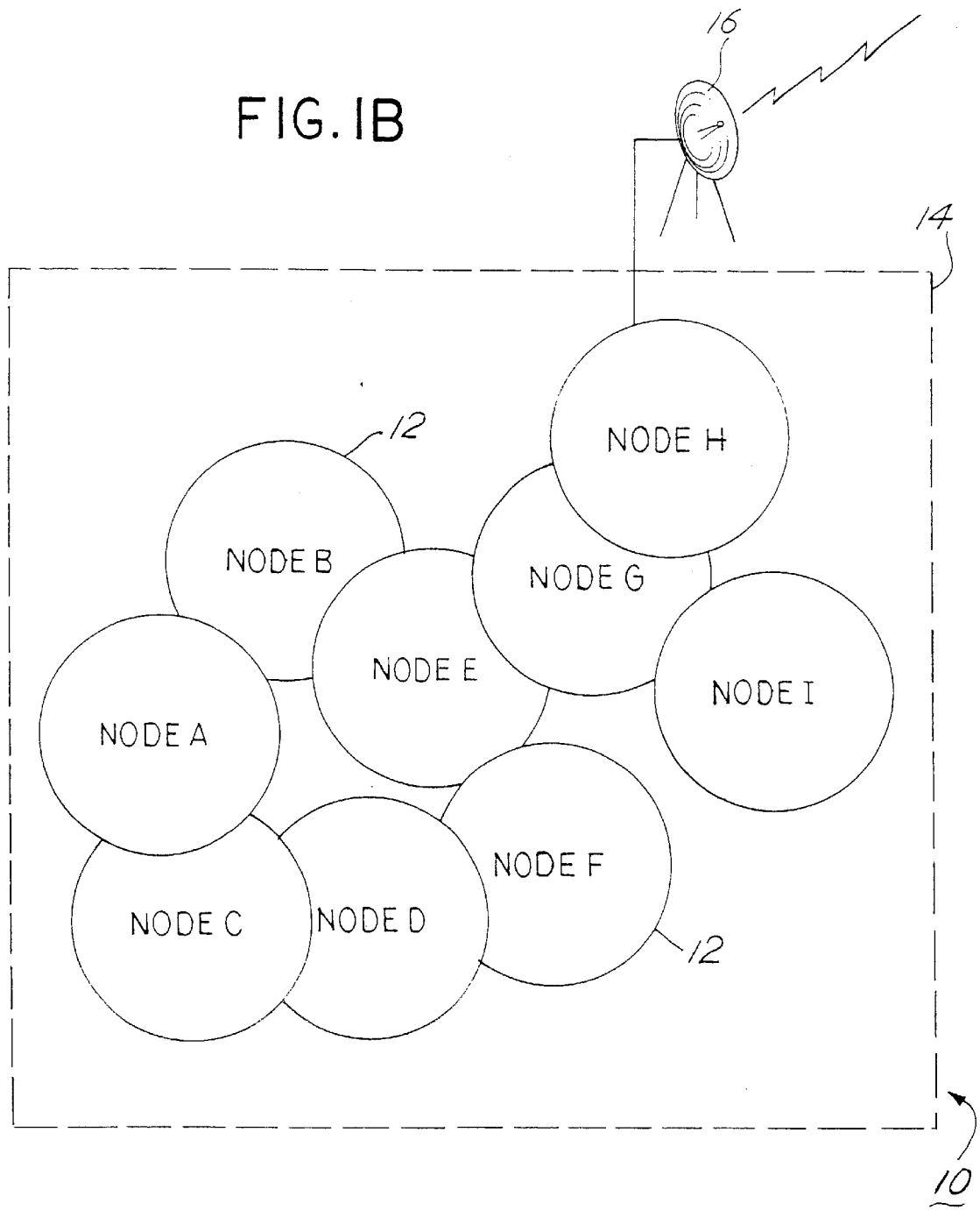
FIG. IB

US 6,717,919 B1

IMPRINTING METHOD FOR AUTOMATED REGISTRATION AND CONFIGURATION OF NETWORK DEVICES

BACKGROUND OF THE INVENTION

This invention relates generally to the field of networking, and more particularly to the field of configuring network devices (referred to as "nodes" herein) initially when they are installed on the network. The nodes may be wireless devices. Furthermore, the nodes need not necessarily be computing devices, rather they could also be low bit-rate devices such as elements of a sprinkler control system, a heating, venting and air conditioning (HVAC) system, or security system in a residence, office, or building. The invention is particularly suitable for implementation in a residential environment, since it provides for automatic registration and configuration of the nodes in the network without requiring the services of technically trained personnel.

Prior art solutions for networking devices in a residential environment have tended to require expensive, highly complex Ethernet—based network equipment, similar to that found in a commercial setting. Home networking solutions generally have required significant technical expertise to install and manage. Often, the would-be purchaser of the product lacks such expertise, resulting in foregoing purchase of such systems, or experiencing frustration and further expense in getting it to operate properly. This is especially the case in getting the system to inter-operate with other networks outside of the residence.

The present invention provides methods for connecting a plurality of elements together in a network. The inventive method provides a significant improvement to prior art manual, user-performed configuration and registration procedures.

SUMMARY OF THE INVENTION

In a first aspect of the invention, a method is provided for configuring a node in a network. The method includes the step of receiving a packet at the node, with the packet comprising fields containing configuration information for a network element that sent the packet. The method continues with the step of automatically configuring the node by imprinting the node to configuration information in the packet, that is, by the node adopting for itself the configuration information contained in the fields of the packet. Preferably, the configuration information is stored in a non-volatile memory in the node for use in all future packets that the node transmits, and for future use in the case that the node undergoes a soft reset, such as by turning the node off and back on again.

The configuration information that the new node imprints to can vary depending on the network topology, design or architecture, and is not considered particularly important or critical. In the illustrated embodiment, the configuration information comprises a site ID and a subnet ID. The site ID identifies a particular location (such as a residence) where the network exists. The subnet ID identifies a logically defined group of network elements.

In another aspect of the invention, a method is provided for configuring a node in a network, comprising the steps of first installing the node (e.g., connecting the node to the network or otherwise turning the node on). Once the node is installed, it begins listening for packets transmitted by an element of the network for a predetermined period of time. If, during the predetermined period of time, the node receives a packet transmitted by another network element, the node imprints to configuration information contained in the packet. If no such packet is received in this period of time, the node assumes that it is the first element to be connected to the network and therefore it adopts configuration information derived from a pre-installed source stored in a memory in the node, such as the node's pre-installed Medium Access Control (MAC) address. The configuration information derived in either fashion (from imprinting to another packet or from the pre-installed source) is then stored in a non-volatile memory for future use.

In still another aspect of the invention, a network of elements communicating with each other to form a system is provided. The network comprises a plurality of nodes or network devices (the nature and type is not important). The nodes periodically transmit "heartbeat" packets to each other to thereby identify themselves as being connected to the network. At least one of the plurality of nodes is automatically configured to the network when it is installed in the network by imprinting to configuration information contained in the heartbeat packets.

These and still other aspects and features of the present invention will be described in further detail in the following detailed description of a presently preferred embodiment of the invention. The following description describes several embodiments, including a wireless network embodiment in which wireless nodes broadcast packets to other nodes in a flooding process, and in which anti-looping codes are present in the packets to prevent infinite transmission of the packets. Many details of the wireless embodiment described below are not essential or critical to practice of the invention. The true scope of the invention is defined by the appended claims, and is not intended to be limited to particular features of the illustrated, representative embodiments.

BRIEF DESCRIPTION OF THE DRAWINGS

In the following description, reference will be made to the appended drawings, wherein like reference numbers refer to like elements in the various views, and in which:

FIG. 1B is a diagram of a wireless network in which the elements or nodes of the network may be configured in accordance with a presently preferred embodiment of the invention;

DETAILED DESCRIPTION OF THE PREFERRED EMBODIMENT OF THE INVENTION

Figure 1A:
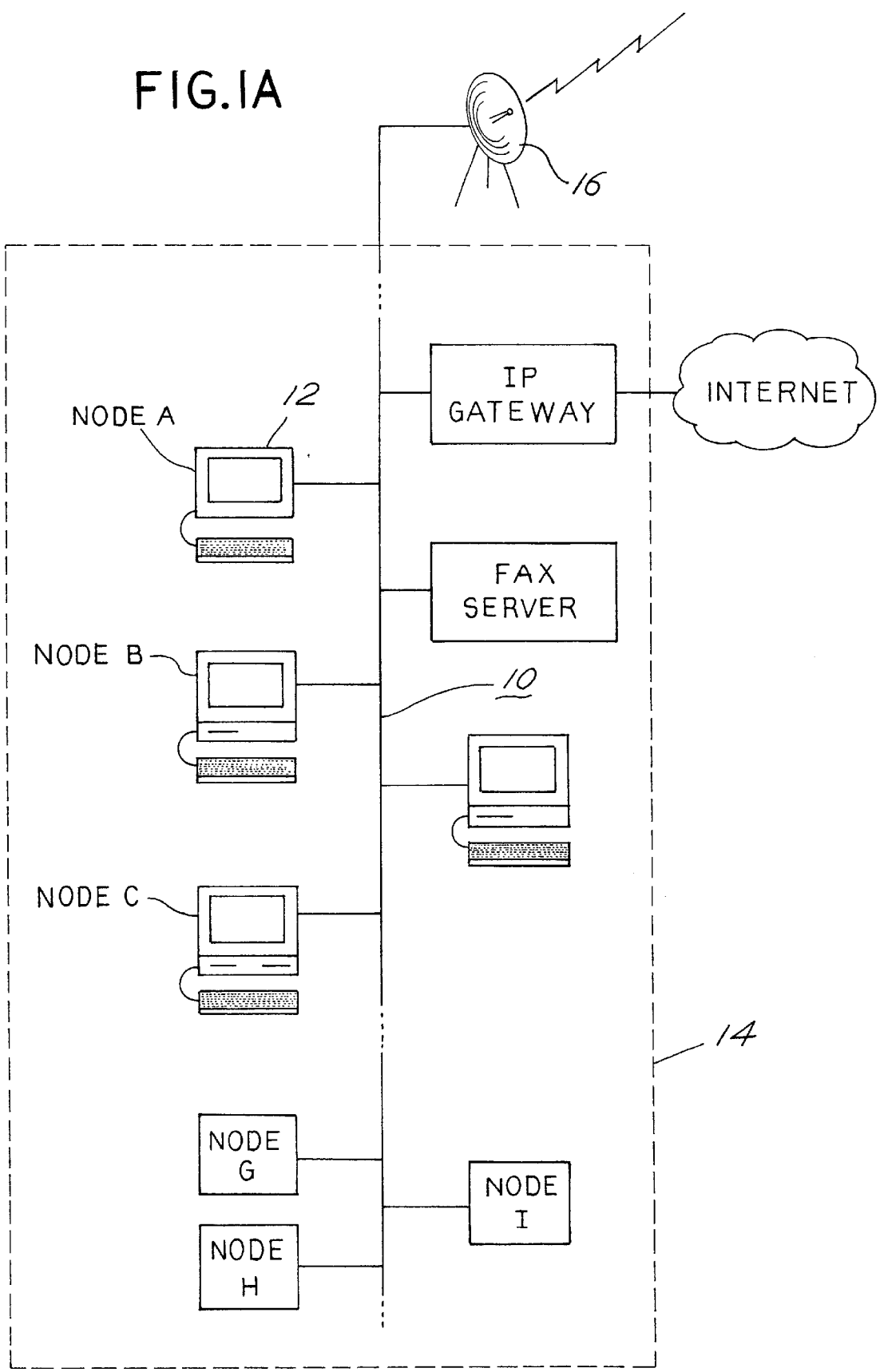
FIG. 1A is a diagram of a network in which the elements or nodes of the network may be configured in accordance with a presently preferred embodiment of the invention.

Referring now to FIG. 1A, a network 10 using the methods of the present invention may take the form as shown. The network 10 consists of a plurality of individual network elements or nodes 12, represented by Node A, Node B, etc. In the illustrated example, the nodes 12 are all physically located within a particular building or site 14, which may, for example, be a residence, office building, warehouse, or other structure.

All of the nodes 12 are considered to be part of a logical domain, namely a grouping of nodes to perform part of an overall system, such as a home computer network, or a HVAC, sprinkler, entertainment, security, or other system. In an example of a HVAC system, the nodes A–G could be considered to be thermostats in various rooms of the building, node H is a controller governing the operation of the HVAC system, and node I represents a controller attached to a heater or air conditioning unit. In the example, node H may be connected to an antenna 16 on the rooftop of the building so as to allow the HVAC controller node H to communicate with another entity in another domain, such as a utility company, home office, other building site of the company, etc. The principles of the invention apply regardless of the type of nodes and system. It will be noted that the system is particularly useful for low bit-rate systems, such as a HVAC, security, sprinkler, or other similar type of system.

FIG. 1B shows a wireless network having a plurality of wireless nodes 12. Each of the nodes 12 is assumed to be physically located at the center of the circle representing the node. The perimeter of the circle represents the node's range for receiving and transmitting information in a RF communications medium. Two circles which touch or overlap are considered to be within range of each other. Thus, node A is in range of nodes B and C, but not in range of Node E or F.

In either network type of FIGS. 1A and 1B, new network elements that are installed in the network 10 are automatically configured using an imprinting process, explained in further detail below. Basically, in this process, when the new node is first installed and turned on, it starts listening for packets from other nodes in the network. When a packet is received, the new network element "imprints" to network information configuration information contained in the packet. For example, the new node imprints to the packet by adopting site ID and subnet ID values that are contained in the first packet. The site ID and subnet ID values allow the new network element to intelligently communicate with other network elements.

If the new network element does not receive a packet in a given amount of time, e.g., 30 or 60 minutes, the new network element assumes that it is the first element of the network. It therefore adopts site ID and subnet ID values from another source, such as deriving them from a 48-bit Medium Access Control (MAC) address that is assigned to the network element and previously stored in non-volatile memory in the node.

The wireless RF network 10 of FIG. 1B operates by a node broadcasting a communication, i.e., packet, to all the other nodes that are within range. Each of the nodes receiving the packet re-broadcasts the packet to all the other nodes that are within range of it, and so forth in an iterative fashion, until all nodes in the domain or site 14 have received the packet. This process "floods" the domain or site. To prevent a recursive or endless circulation of the packet, special coding, in the form of de-looping codes, is included in the packet to ensure that each node rebroadcasts a specific packet exactly one time. Also, special coding is included to ensure that packets from different sites, logical domains, or different subnets are ignored.

Figure 2:
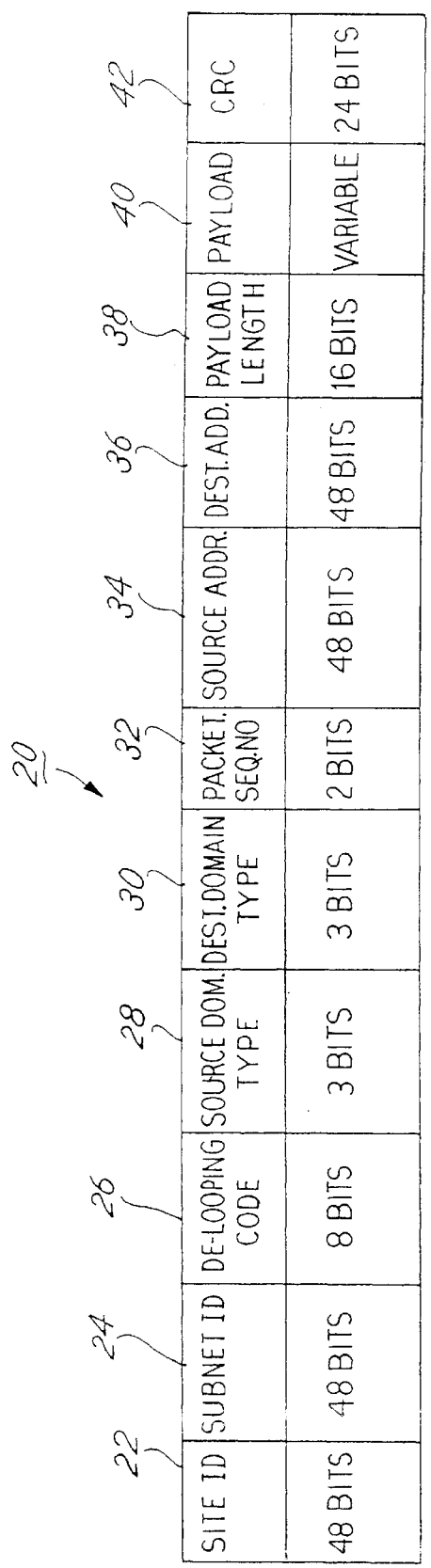
FIG. 2 is a diagram of the structure of a packet that is generated by a node in the network of FIG. 1 and circulated to the other nodes on the network (or subnetwork, as the case may be), or to higher logical domains.

A packet structure for packets generated and broadcast by the nodes of FIGS. 1A and 1B is shown in FIG. 2. The packet 20 consists of the following fields: a forty-eight bit site identification field 22, a forty-eight bit subnet identification field 24, an eight bit de-looping code, a three bit source domain type identifying field 28, a three bit destination domain type identifying field 30, a two bit packet sequence number field 32, a forty-eight bit source address field 34, a forty-eight bit destination address field 36, a sixteen bit payload length field 38, a variable length payload field 40, and a twenty four bit cyclic redundancy check (CRC) field 42.

The site ID field 22 is used to uniquely identify nodes on a given site, such that nodes on an adjacent site that happen to receive the packet 20 ignore the packet. A "site" is defined as a residence, office, warehouse, or other physical location.

The subnet ID field 24 uniquely identifies nodes in a logical sub-network, such that nodes from an adjacent sub-network that happen to receive the packet 20 ignore the packet. Thus, subnet ID field 24 allows a subset or group of nodes in any given site to be logically grouped together and individually controlled.

The de-looping code field 26 contains an eight bit code which is determined to be unique at start-up or initialization of the system. This code is used in the algorithm described below to eliminate infinite loops of packet transmission during the process of flooding the site with packets. The derivation and use of the de-looping code is described in further detail below.

The source domain type field 28 is a three bit code which indicates the type of domain that the node originating the packet belongs to. The destination domain type field 30 indicates which domains (i.e., logical groupings or hierarchical organization) the packet is intended to be distributed. The available values in fields 28 and 30 correspond to the following defined types of domains:

| | | |
|---|---|---|
| 0 | = | diagnostic |
| 1 | = | Mobile |
| 2 | = | Small Site |
| 3 | = | Medium Site |
| 4 | = | Large Site |
| 5 | = | Neighborhood |
| 6 | = | Community |
| 7 | = | Global |

The packet sequence number field 32 is a code which is used in the de-looping algorithm as explained below.

The source address field 34 contains a 48 bit IEEE 802.3-style medium access control (MAC) address of the source node.

The destination address field 36 contains a 48 bit IEEE 802.3-style medium access control (MAC) address of the destination node.

The payload length field 38 contains a sixteen bit unsigned integer length of the payload field, exclusive of the other fields described herein.

The payload field 40 is a variable-length data field, containing an integer number of octets of data being transmitted by the node generating the packet 20.

The CRC field 42 is a twenty four bit CRC calculated according to the polynomial specified by the IEEE 802.3 standard.

In addition to the above fields, one or more fields reserved for future use could be part of the packet 20 structure, such as a three bit field inserted between the packet sequence number field 32 and the source address field 34. Persons skilled in the art are able to develop software for generating the packets 20 having the structure of FIG. 2.

Network Architecture for a Possible Wireless Network Implementation

In one possible embodiment of the invention, the network architecture is divided into logical segments or domains. As described above, there are eight different domains that are defined. The diagnostic and mobile domains are special purpose domains. The diagnostic domain is a placeholder or reserved for future definition. The mobile domain is for special types of nodes which are capable of sending and receiving data from whichever subnet is within range. All of the other domains are designed as a hierarchical scoping mechanism. The domain addressing field 30 of FIG. 2 controls and allows the node to communicate with higher level domains, including neighborhood or global domains, using bridging nodes that link one domain with another. The destination domain ID field 30 identifies the highest domain to which the packet should be sent or broadcast.

As an example, consider node A in FIG. 1B to be a temperature sensor in a commercial HVAC system. In this example, the small site may consist of temperature sensors (nodes) in a particular region or wing of the building, and the large site domain may indicate the central control system for the entire building, located some distance away. Node A indicates in field 30 that the temperature reading represented in the payload field 40 should be sent to the large site only by placing a value of 4 in field 30. All the nodes below the large site domain that receive the packet should broadcast the packet in order to guarantee that the bridging node receives the packet. By using this technique (and by providing any necessary bridging nodes that communicate between different domains in the hierarchy of domains), wherever the thermostat or element represented by node A is, receipt of the message by the node in the intended domain is ensured.

Figure 3:
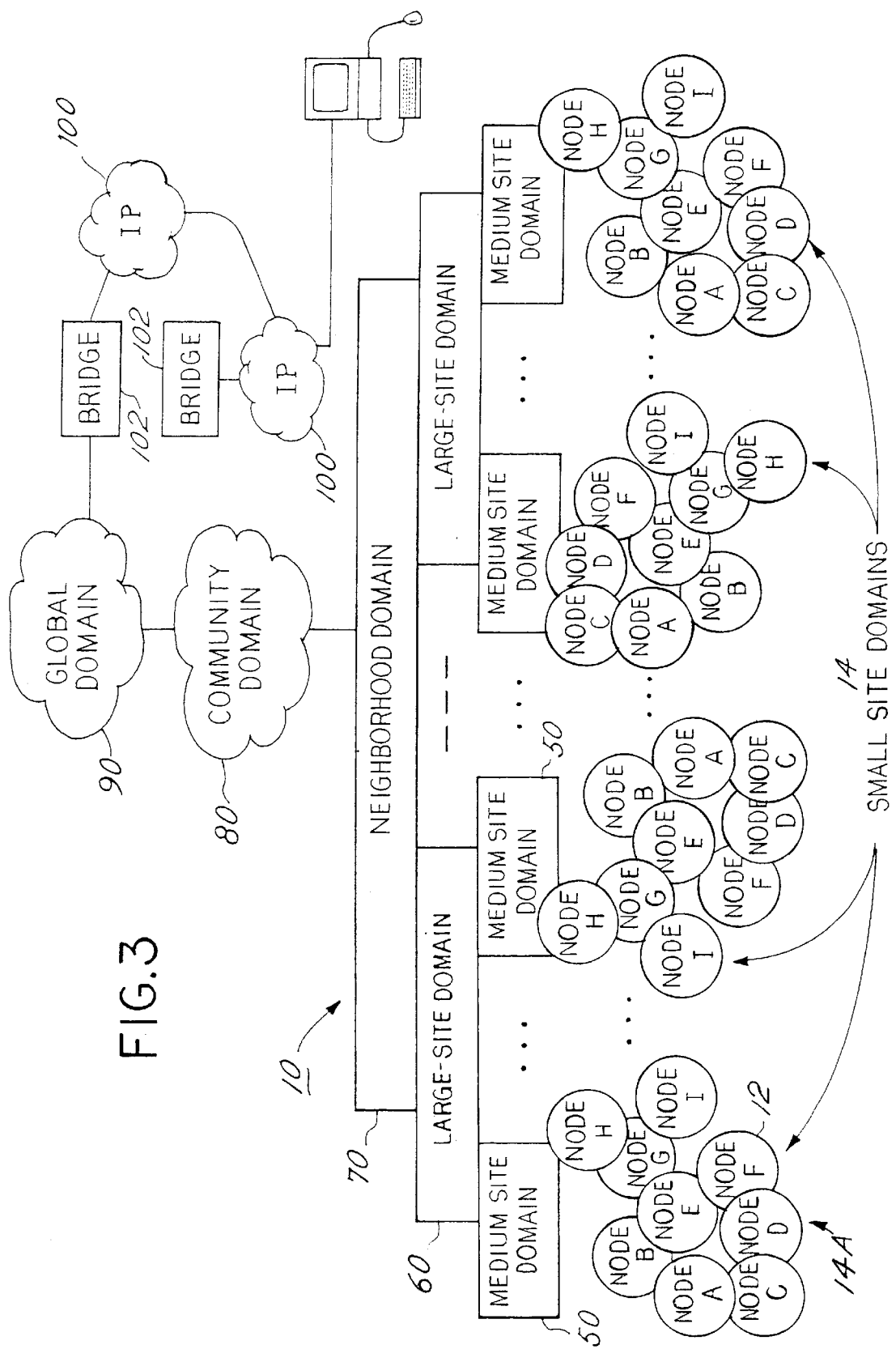
FIG. 3 is a diagram of a network architecture in which the elements or nodes of the network may be configured in accordance with a presently preferred embodiment of the invention, and communicate with higher level domains, such as community or global networks, including LAN or WAN IP networks.

As noted above, the small site domain is where the individual node is physically located. In a preferred embodiment, if more than 100 nodes exist at a site (residence, office, warehouse, etc.), the nodes are partitioned into multiple small site domains, all under a medium site domain 50. The architecture is illustrated in FIG. 3. A domain bridging device or node is used to communicate between the multiple domains, e.g., at node H in FIG. 3 which links the other nodes in the small site domain 14A to the medium site 50. Similarly, if there are too many medium site devices (e.g., 100), then a large site domain 60 is defined, with associated medium site domain to large site domain bridging devices or nodes implemented. These bridging devices or nodes can take the form of a IP router, bridge, or other known type of communications device known and commercially available, the details of which are not particularly important.

Referring to FIGS. 1A, 1B and 3, communication between physical locations or sites is accomplished via a neighborhood domain 70. A site-to-neighborhood bridging device would be used to accomplish this inter-domain communication. As one possible implementation, the small antenna 16 mounted to the roof of the site 14 (e.g., house) is used to communicate in a store and forward fashion with other houses in a neighborhood, in much the same fashion in which nodes 12 within a site communicate with each other.

Communications outside of the neighborhood domain 70 takes place through bridges to community and global domains 80, 90 (which could be local and wide area enterprise networks, respectively). It is envisioned that these community and global networks 80 and 90 transition to routed domains 100, i.e., IP-based networks at the edges of the neighborhood domains, or even within a site, at a bridge 102 to a local or wide area IP network.

A low-cost RF network implementation of the invention works using a store and forward mechanism. Each packet received by a node is re-transmitted to all adjacent nodes in range only once. This process floods the subnet or site with the contents of the packet, insuring that all nodes, including the intended recipient, will receive it. To avoid infinite loops due to this topology, such as due to the fact that nodes can hear each other and a given pair of nodes could transmit the same packet endlessly between each other, the de-looping feature is implemented.

The de-looping code, placed in field 26 of every packet (see FIG. 2) is therefore used to prevent packets, which have been sent to all adjacent nodes, from being transmitted if the receiving node has already done so once before. Each node on a subnet must have a unique 8 bit de-looping code. Each packet 20 has a two-bit packet sequence number in field 32. An array of 256 two-bit codes is stored at each node, one set per possible de-looping code. The combination of the de-looping code and the packet sequence number is used to determine whether the packet currently in the node's transmit buffer is the same as the last packet seen from the node associated with the de-looping code. If the de-looping code and packet sequence numbers match, the packet is discarded as it has already been sent. If not, the packet is retransmitted to pass it on to any node which has not yet seen it. In every case, each node in the system will transmit the packet exactly once.

The determination or assignment of the de-looping codes is as follows. Each node has an eight bit de-looping code which is unique within the subnet. The code is determined in the following iterative process:

(1) An initial value is taken from the least significant 8 bits of the node's MAC address.

(2) A null-addressed packet is then transmitted to the other nodes on the subnet. Any node which receives the packet and has the same 8 bit code responds by picking a new 8-bit code, at random. The new code is used in sending out another null-addressed packet.

(3) Steps (1) and (2) are repeated until all the nodes on the subnet have selected a unique code.

In a fully populated network or system, there will usually be at most 100 nodes per subnet. With 256 possible 8 bit de-looping codes, each attempt to determine a new code by a node will have a likelihood of failure of 99/256 or 39 percent. That is, 99 of the 256 possible codes will already have been selected by the other nodes. Two attempts in this iterative process reduces the failure rate to $(99/256)^2$, or 15 percent. After 3 attempts, the probability of duplication is $(99/256)^3$ or 6 percent. The probability of duplication goes below 1 percent after two more iterations. This implies that for even a fully populated network, it will take only a few iterations for all the nodes in the subnet to be assigned unique de-looping codes.

Use of subnet addressing in the subnet ID field 24 allows for nodes to be logically organized into different groups or subnetworks. The 48 bit subnet ID number is used to identify the particular subnet that the packet is to be transmitted on. If a packet is received by a node with a subnet ID which differs from the subnet the node is assigned to, the packet is ignored. Note that adjacent nodes in any site may be logically a part of different subnets. Thus, the elements or nodes in a security system may be assigned to one subnet and the nodes or elements in a HVAC system may be assigned to another subnet. Even though nodes of both systems may be in range of each other, they will ignore all received packets that have subnet ID for a system they are not grouped in.

The flooding of packets in any subnet when a packet is transmitted has the potential for collisions, should the nodes attempt simultaneous retransmission of the packet. A very simple method for determining access to the RF channel is therefore implemented. All the nodes monitor the RF channel and if a carrier is detected (i.e., indicating that a transmission is currently in progress), then the node's transmission is disabled. Following the end of the transmission, the method assumes that a collision would occur. Accordingly, all the nodes implement an exponential back-off algorithm to cause each node to back off (i.e., avoid transmission), for some random period of time and then transmitting. Since all the nodes are backing off for randomly determined periods of time (and each presumably different from the other), the likelihood of a collision is greatly reduced.

Automated Registration and Configuration of Network Nodes

Figure 4:
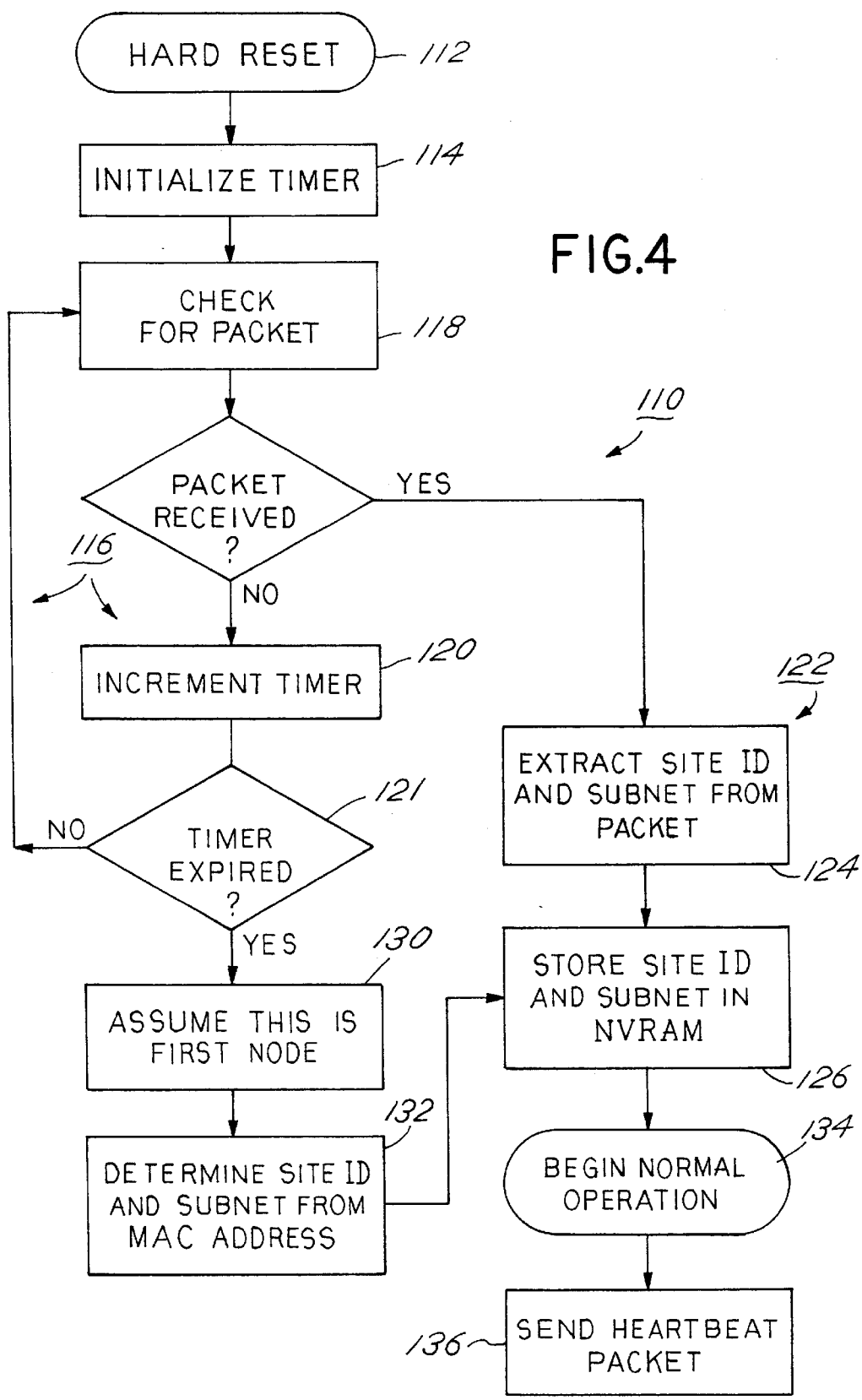
FIG. 4 is a flow chart showing the process for automatic registration and configuration of the nodes of FIG. 1 or FIG. 2.

With reference now to FIG. 4, the automated registration and configuration of the nodes of the network of FIGS. 1A and 1B and 2 will be described. Briefly, each network node comes with a unique 48-bit MAC address pre-installed and stored in non-volatile memory in the node. When a node is subject to a "hard reset", it begins listening for messages. A hard reset, in the present context, is a reset where no information is retained from previous operations. A hard reset would normally occur when the node is first installed in the network. The node uses the first message it receives to determine its site ID and its subnet ID. This is basically an imprinting process: the node imprints, or adopts, as its own site ID and subnet ID the site ID and subnet ID of the first packet it receives. The site ID and subnet ID are then stored in a non-volatile memory in the node, and are used to initialize the node at each subsequent "soft reset", e.g., when the machine or node is switched off and then turned on again. The site ID and subnet ID are inserted into their respective fields for packets that the node may later transmit. It will be understood that the configuration information that the node imprints to could differ for different embodiments of the invention, and that the precise configuration information that the node imprints to is not considered particularly critical or important for other possible embodiments.

In the illustrated embodiment, the site ID is a 48-bit code which is used to uniquely identify the domain in which this node operates. The subnet ID is an 8 bit code which is used in combination with the site ID to identify a group of nodes which communicate directly. The packet structure of the packets received by the node immediately after a hard reset is shown in FIG. 2 and described previously.

Referring now to FIG. 4, the registration and configuration process 110 is shown in a flow-chart form. Starting with a hard reset at 112, a timer in the node is initialized at step 114. Over a predetermined period of time, say 30 or 60 minutes, the node loops, as indicated at step 116. In this loop, the node alternately checks for receipt of a packet at 118, and updates the timer at step 120. The timer is checked at step 121, and if it is not expired the process 116 loops back to step 118.

If a packet is received at step 118, it is assumed to be from a node in the network to which the subject node is to "imprint". The process 122 shown in the lower right of FIG. 4 then takes place. The site ID and subnet ID are extracted from their respective fields of the received packet (see FIG. 2), as indicated at step 124, and stored in a non-volatile storage medium at step 126 for use in all future packets it may generate. Normal operation of the node then commences as indicated at step 134

If no packet is received during this initialization period, i.e., the timer expired at step 121, an assumption is made that the node is the first node in the subnet as indicated at 130. The node uses its MAC address as the site ID, and the least-significant 8 bits of the MAC address as the subnet ID, as indicated at step 132. These values are stored in non-volatile memory for future use, as indicated at step 126. After commencing normal operation at step 134, the node begins to periodically send a "heartbeat" packet to all sites on the subnet or site, say every minute or 10 minutes as indicated at step 136. The period selected for the "heartbeat" packet should be less than the initialization time that the node waited for receipt of packets from other nodes at the site. Any further nodes that may be installed at the site for the first time will imprint to these site ID and subnet ID values, using the configuration process described above.

The "heartbeat" packets that are transmitted among the nodes of the network serve to identify themselves as being connected to the network. The "heartbeat" packet could have the form of FIG. 2, but have an empty payload field. The destination address could be a multicast address for the particular site or domain where the node is installed.

Figure 3A:
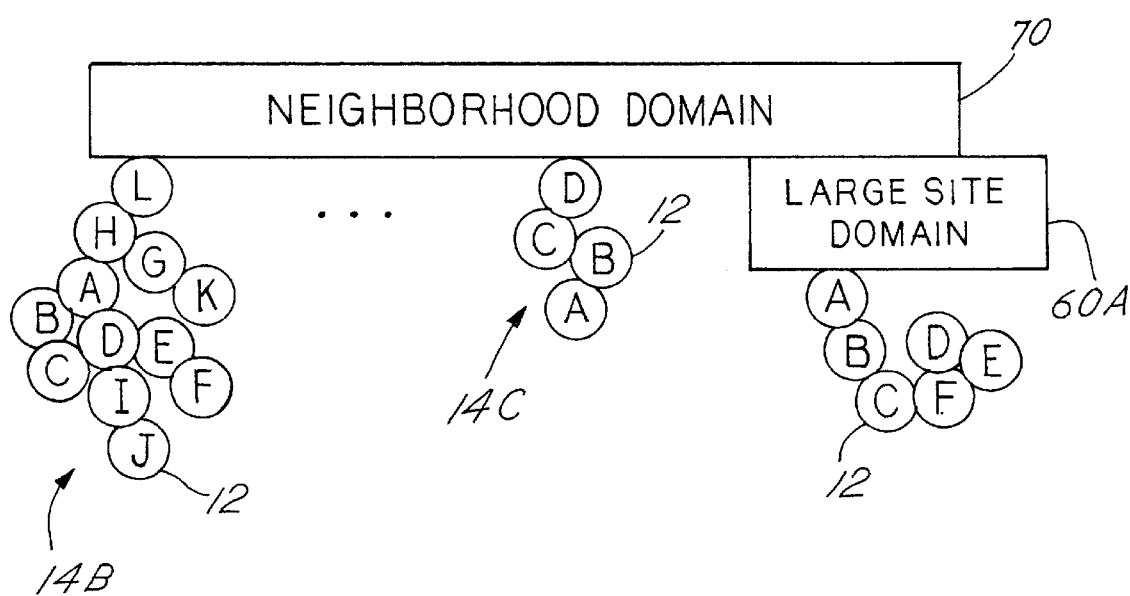
FIG. 3A is a diagram showing how lower level, small site domains can be connected directly to higher level domains using a principle of domain collapsing.

In many conceivable implementations of the invention, the population of the domains, and particular the small site domains, will be sparse. In a typical situation, shown in FIG. 3A, there exists a small site domain 14 with nodes A–L 12, but no large site domain or medium site domain. In these types of cases, the network 10 automatically collapses, i.e., reconfigures, the three domains, small, medium and large, into a single domain. A controller (not shown) does this reconfiguring of the network 10 in the neighborhood domain, the domain over the missing medium and large site domains. Each of the domain bridging devices, i.e., node L in small site domain 14B and node D in small site domain 14 C of FIG. 3A, sends out a periodic "heartbeat" packet to the neighborhood domain. Over a period of time, the neighborhood domain controller or bridge will have received the "heartbeat" packets, or other packets, from the domains below it. The neighborhood domain controller uses this information to determine the highest level or domain of a device within range. This may be a simple node residing in a small site domain, as in the case of domains 14B and 14C, or it may be a bridge controller for medium and large site domains, e.g., a bridge controller in large site domain 60 A of FIG. 4. The neighborhood domain 70 bridge then will automatically accept and handle (redirect) all packets intended for the missing domains. This allows a network to automatically configure and reconfigure as necessary with little or no human intervention.

Various modifications and alternative embodiments from the above-described presently preferred embodiment will be apparent to persons of skill in the art. The type of devices or "nodes" comprising the elements of the residential or small site network is not particularly important, and can be part of a home computer system, security system, HVAC system, sprinkler system, or any other type of system that involves communication between multiple elements to carry out a particular objective. Furthermore, examples of use of the invention in both wireless and non-wireless networks are contemplated. As noted above, the hardware details and type of system in which the methods of the present invention are implemented are not considered to be critical or particularly important. The scope of the present invention is thus not limited to the preferred embodiments, but rather is to be determined by reference to the appended claims.

We claim:

1. A method for configuring a node in a wireless network, comprising the steps of:
   a) installing said node;
   b) listening for any packets transmitted by an elements of said wireless network for a predetermined period of time;
   c) if, during said predetermined period of time, said node receives a packet transmitted by any of said elements, said node imprinting to configuration information contained in said packet;
   d) otherwise said node adopting configuration information from a pre-installed source stored in a memory in said node; and
   e) storing said configuration information derived from either step (c) or step (d) in a non-volatile memory in said node.

2. The method of claim 1, wherein said configuration information comprises site ID and subnet ID information.

3. The method of claim 1, wherein said pre-installed source comprises a Medium Access Control (MAC) address for said node stored in memory.

4. The method of claim 1, wherein said wireless network comprises a network installed in a residence.

5. The method of claim 1, wherein said wireless network comprises elements of an HVAC system.

6. The method of claim 1, wherein said wireless network comprises elements of a security system.

7. The method of claim 1, wherein said network comprises a network of computers.

8. The method of claim 1, wherein said packet further comprises a field comprising an anti-looping code.

9. A method of configuring a node in a wireless network, comprising the steps of:
   a) turning said node on;
   b) receiving a first packet at said node from a network element in said wireless network, said packet comprising at least one field containing configuration information for said network element that sent said packet; and
   c) automatically configuring said node by adopting said configuration information contained in said first packet; wherein said packet further comprises a field comprising an anti-looping code; said anti-looping code comprising a series of bits, wherein each node in said wireless network is assigned a unique anti-looping code.

* * * * *